March 21, 1933.  G. A. HALFVARSON  1,902,640
BRAKE
Filed April 12, 1928  2 Sheets-Sheet 1

Fig. 1.

INVENTOR
*Gustaf A. Halfvarson.*
BY
ATTORNEY

March 21, 1933.  G. A. HALFVARSON  1,902,640
BRAKE
Filed April 12, 1928  2 Sheets-Sheet 2

INVENTOR
Gustaf A. Halfvarson.
BY
ATTORNEY

Patented Mar. 21, 1933

1,902,640

UNITED STATES PATENT OFFICE

GUSTAF A. HALFVARSON, OF VERONA, PENNSYLVANIA, ASSIGNOR TO WESTINGHOUSE ELECTRIC & MANUFACTURING COMPANY, A CORPORATION OF PENNSYLVANIA

BRAKE

Application filed April 12, 1928. Serial No. 269,535.

My invention relates to improvements in brakes and particularly to brake mechanism of the electro-mechanical type in which the brake is applied mechanically by springs or their equivalents and is released by an electromagnet or motor.

The object of the invention, generally stated, is the provision of a brake that shall be simple and efficient in operation, readily adjustable and adapted for easy and economical manufacture.

A more specific object of my invention is to provide a brake in which no lost motion occurs during the operation of its movable parts.

Another object of my invention is to provide a brake in which the brake shoes are self-aligning in all directions on the brake drum.

It is also an object of my invention to provide a brake that may be operated with a minimum amount of clearance between the brake shoes and the brake drum.

Other objects of the invention will, in part, be obvious and will, in part, appear hereinafter.

For an illustration of one of the various forms my invention may take, reference may be had to the accompanying drawings in which;

Figure 1 is a view, in end elevation, of a brake embodying my invention;

Figure 2:
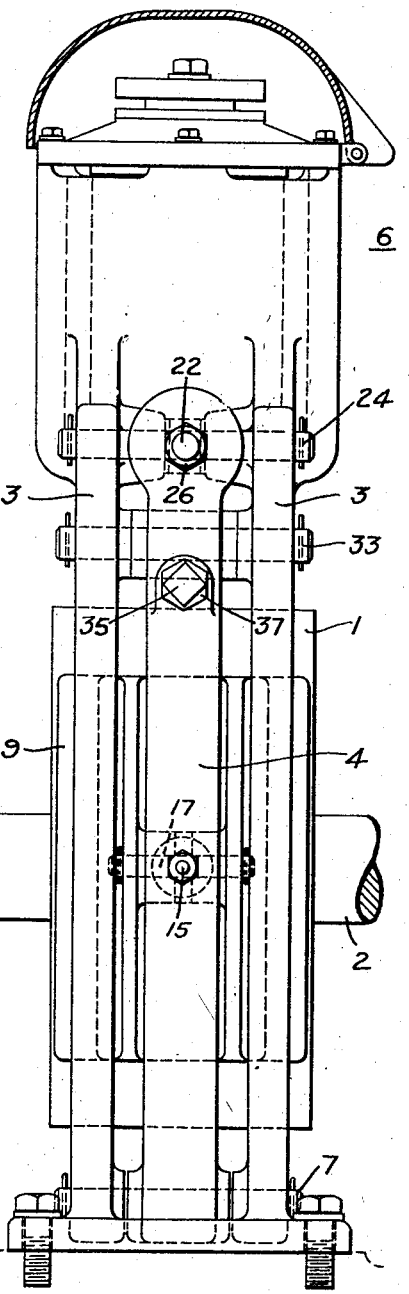
Fig. 2 is a view, in side elevation, of the brake illustrated in Fig. 1.
Figure 3:
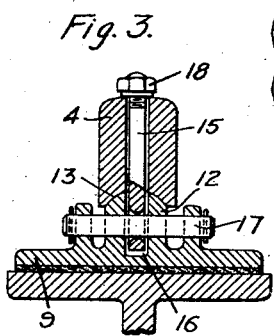
Fig. 3 is a view, in section, taken along the line III—III of Fig. 1.

In the drawings, I have illustrated a brake drum 1 as affixed to a driving shaft 2 to which a braking effect is to be applied. Surrounding the brake drum 1 is a yoke or frame 3 which carries and supports a pair of brake levers 4 and 5 and an electromagnet 6 for operating the brake levers.

As shown, the brake levers 4 and 5 are disposed on opposite sides of the drum 1 with their lower ends pivotally connected by pivot pins 7 and 8 to the frame 3 and are provided with a pair of brake shoes 9 and 10 for engaging the brake drum 1.

It will be noted that each of the brake shoes 9 and 10 is seated on its supporting brake lever by means of a universal joint in the form of a ball-and-socket connection comprising a ball 12 formed on the shoe and a socket 13 formed in the central portion of the lever. Each shoe is bolted to its supporting lever by means of an eye bolt 15, the inner end of which is secured in a slot 16 in the ball portion of the shoe by pivot pin 17. As shown, the inner end of the eye bolt 15 is mounted on the pivot pin 17 in the shoe with sufficient play to permit the shoe to rotate, to a limited degree, in any direction. The outer end of the eye bolt 15 is provided with a nut 18 for drawing the bolt and shoe tightly against the brake lever, thereby causing the ball to be frictionally retained in the socket.

In view of the small area of the engaging surfaces of the ball-and-socket connection, as compared with the large areas of contact between the shoes and the drum, the shoes will be accurately aligned with the drum the first time they are applied thereto by the brake, regardless of the degree to which the eye bolts may be tightened, and, by reason of the frictional engagement of the balls in the sockets, will retain their alignment when they are withdrawn from the drum. Inasmuch as the shoes are held tightly against the levers by the eye bolts under all conditions, no lost motion can occur between the shoes and the levers.

The means for applying the brake shoes 9 and 10 to the brake drum 1 comprises a pair of compression springs 20 and 21 which are mounted on the outer ends of a pair of eye bolts 22 and 23 in position to press against the upper ends of the brake levers 4 and 5. The inner ends of the eye bolts 22 and 23 are secured to the frame 3 by a pair of pivot pins 24 and 25, and the outer ends are provided with a pair of nuts 26 and 27 by which the tension of the springs 20 and 21 may be adjusted.

The electromagnet 6 for releasing the brake shoes is mounted on the upper central portion of the frame 3 and is suitably connected to the brake levers 4 and 5 to separate them against the force of the springs 20 and 21. As shown, electromagnet 6 is provided with a movable armature 31, the lower end of which engages the inner arms of a pair of bell-crank levers 32 and 32' which are pivotally mounted on a pair of pivot pins 33 and 34 in the upper part of the frame 3.

The bell-crank levers 32 and 32' are positioned in the frame 3 in such manner that the outer ends impinge against the inner ends of a pair of set screws 35 and 36 in the brake levers 4 and 5 and thus act as a means for separating the brake levers when the electromagnet 6 is energized. Each of the set screws 35 and 36 is provided with a locking nut 37 for retaining it in any position to which it may be adjusted.

The clearance between the brake shoes 9 and 10 and the brake drum 1 when the brake levers 4 and 5 are separated by the electromagnet 6 may be adjusted by loosening the locking nuts 37 and rotating the set screws 35 and 36 in the proper direction.

It will be observed that the brake mechanism is arranged in such manner that all of the forces exerted by the brake shoes 9 and 10 and by the electromagnet 6 are directed against the inner sides of the brake levers 4 and 5 at points between the pivotal supports of the levers and the compression springs 20 and 21 and, therefore, that the forces exerted by the springs keep the lower ends of the levers pressed against the inner sides of the pivot pins 7 and 8 at all times.

With the brake arranged in the manner described, no lost motion can occur in the movement of the various parts during the operation of the brake, and, therefore, the brake can be adjusted with a minimum amount of clearance between the drum and the shoes. Also, forces that tend to deflect the lever 4 act in the same direction when the brake is applied or released, and therefore there is no effect of lost motion, due to deflection of the arm 4 under the influence of pressure of the spring 20 or the lever 32.

In the operation of the brake mechanism, the brake shoes 9 and 10 are normally held in engagement with the brake drum 1 by the compression springs 20 and 21. Assuming that it is desired to release the brake drum 1, then the conductors 38 and 39 leading to the electromagnet 6 are connected to a suitable source of electrical energy to energize the electromagnet. The energization of the electromagnet causes its armature 31 to move downwardly against the inner ends of the bell-crank levers 32 and 32' and actuate them to separate the brake levers 4 and 5 against the action of the springs 20 and 21, thereby releasing the brake shoes 9 and 10 from the brake drum 1.

It will, therefore, be understood that I have devised a brake that is exceedingly quick in action by reason of the fact that no lost motion occurs in the operation of its movable parts and that is provided with shoes which are self-aligning in all directions.

It will also be observed that the brake shoes 9 and 10 are operated independently of each other and, therefore, that any defect in one shoe will not affect the operation of the other shoe.

While the illustrated example constitutes a particular embodiment of my invention, I do not limit myself structurally to the details shown, since, manifestly, the same may be varied considerably without departing from the spirit of the invention as defined in the appended claims.

I claim as my invention:

1. A brake comprising a brake drum, a frame associated with said drum, a pair of brake levers pivotally mounted, at their lower ends, on said frame, a pair of brake shoes disposed on the inner central portions of said levers for engaging said drum, a plurality of springs independently mounted on said frame and engaging the upper ends of said levers for actuating said levers independently into braking position, and releasing means positioned for engaging said brake levers between the brake shoes and the springs.

2. A brake comprising a brake drum, a pair of brake levers, a pair of brake shoes, an adjustable universal joint for supporting one of the brake shoes on the inner central portion of each of said brake levers for engaging said brake drum, means for continuously biasing said brake levers toward the brake drum, and releasing means for holding the brake levers in brake-releasing position in opposition to said biasing means and so disposed that the levers are always strained in the same direction whether the brake is released or applied, whereby no lost motion can occur in the operation of the levers.

3. A brake comprising a brake drum, a frame associated with said drum, brake levers pivotally mounted, at their lower ends, on said frame, a pair of brake shoes, adjustable universal mountings for supporting one of said brake shoes on each of said levers for engaging said drum, a plurality of springs independently mounted on said frame and engaging the upper ends of said levers for actuating said levers independently into braking position, and means for releasing said brake levers, said releasing means and said brake shoes being connected to the inner faces of the brake levers intermediate their ends, whereby the levers will always be strained in the same direction whether the brake is released or applied, whereby no lost motion can occur in the operation of the levers.

4. In a brake mechanism, a brake drum, a pivoted brake lever having a semi-spherical bearing socket, a brake shoe having a spherical bearing member seated in said socket for movement therein to permit all portions of the contact face of said shoe to engage said drum when said shoe is moved into contact therewith by said lever, an eye bolt extending axially through said socket and bearing member, a pivot pin extending laterally through said bearing member and the eye of said bolt, and a nut on the outer end of said eye bolt for drawing the bearing member tightly into said socket member thereby causing the brake shoe to be frictionally retained in a proper position for accurately engaging said brake drum.

In testimony whereof, I have hereunto subscribed my name this 10th day of April 1928.

GUSTAF A. HALFVARSON.